United States Patent [19]

Lamparter

[11] Patent Number: 4,890,637
[45] Date of Patent: Jan. 2, 1990

[54] ONE WAY VALVE

[75] Inventor: Adolf Lamparter, Etobicoke, Canada

[73] Assignee: Flavorcoffee Co. Inc., Concord, Canada

[21] Appl. No.: 299,091

[22] Filed: Jan. 19, 1989

[30] Foreign Application Priority Data

Dec. 12, 1988 [CA] Canada .................................. 585690

[51] Int. Cl.$^4$ ...................... F16K 51/00; F16K 15/16
[52] U.S. Cl. ............................... 137/246; 137/512.15; 137/550; 137/859; 383/103; 229/DIG. 14; 426/118
[58] Field of Search ................... 137/246, 512, 512.15, 137/550, 859; 383/103; 229/DIG. 14; 426/118

[56] References Cited

U.S. PATENT DOCUMENTS

| | | | |
|---|---|---|---|
| 2,946,502 | 7/1960 | Metzger | 383/103 X |
| 3,432,087 | 3/1969 | Costello | 426/118 X |
| 3,595,467 | 7/1971 | Goglio | 383/103 |
| 3,628,720 | 12/1971 | Schmedding | 229/DIG. 14 X |
| 3,799,427 | 3/1974 | Goglio | 137/246 X |
| 3,949,934 | 4/1976 | Goglio | 426/118 X |
| 4,000,846 | 1/1977 | Gilbert | 426/118 X |
| 4,134,535 | 1/1979 | Barthels et al. | 426/118 X |
| 4,206,870 | 6/1980 | DeVries | 426/118 X |
| 4,310,118 | 1/1982 | Kisida et al. | 383/103 X |
| 4,444,219 | 4/1984 | Hollenstein | 137/246 |

FOREIGN PATENT DOCUMENTS

| | | |
|---|---|---|
| 912509 | 10/1972 | Canada . |
| 956602 | 10/1974 | Canada . |
| 981224 | 1/1976 | Canada . |
| 1005797 | 2/1977 | Canada . |
| 1018116 | 9/1977 | Canada . |
| 1114337 | 12/1981 | Canada . |
| 1177449 | 11/1984 | Canada . |

Primary Examiner—John Rivell
Attorney, Agent, or Firm—Rogers, Bereskin & Parr

[57] ABSTRACT

A one way valve for flexibly walled packages is disclosed. The valve comprises a unitary valve body having an outer face with a raised anvil having a first valve seat surrounding a central depression. A generally planar surface is provided adjacent the anvil forming a second valve seat. The second valve seat terminates in an outer wall which includes a first marginal portion extending towards the anvil and a second marginal portion extending away from the anvil. An elastic diaphragm is also provided which seats on the second valve seat with at least a part of the diaphragm being below the first marginal portion of the outer wall. At least one aperture is provided through the valve body from the outer face to an inner face. The aperture opens at one end onto the second valve seat and at the other end onto an indented portion of the inner face. A filter is housed in the indented portion across the other end of the aperture opening. The valve body is securable to a web of the flexibly walled packaging around the second marginal portion. The web, when the valve body is so secured, is stretched across the first valve seat and has a hole punched therein. Pressure, in at least one of the apertures, can raise a portion of the diaphragm away from the second valve seat and subsequently raise a portion of the web away from the first valve seat.

14 Claims, 2 Drawing Sheets

ONE WAY VALVE

BACKGROUND OF THE INVENTION

This invention relates to a one-way valve and in particular to a one-way valve suitable for flexibly walled packages. Such flexibly walled packages are used extensively for packaging food stuffs such as roasted coffee beans, grounds, and the like.

In the past, one-way valves have been used for preventing the exposure of packaged food stuffs to the effects of oxygen. Oxygen in the presence of many foods promotes an oxidation reaction which can result in the food loosing its flavour, texture or colour. Consequently, it is advantageous to the saleability of the food to prevent the food from coming into contact with oxygen. In the case of roasted coffee, there is the additional factor that the roasted coffee tends to produce gas over a period of time after being contained in the flexible packaging. The production of such gas must be accommodated, either by an expanding flexible container or more simply by a one-way valve which permits the egress of gases produced by the roasted coffee while prohibiting any ingress of air containing oxygen and the like.

Roasted coffee tends to produce $CO_2$ over time. The rate of gas emission depends upon such factors such as bean origin, roast and storage temperature, grind size, surrounding atmospheric pressure and the length of time since the coffee was roasted. Typically, greater amounts of gas are given off immediately after roasting The emission rate can also be influenced by evacuating or flushing a container of freshly roasted coffee with an inert gas. Because the amount of gas is variable, a one way valve is preferred over a flexible package. In a flexible package, an overpressure is likely to burst the package rendering the goods unsaleable. A one way valve, on the other hand will allow overpressure inside of the package to vent, thus maintaining a safe pressure at all times. The valve also has the advantage that the initial gas produced will tend to displace any air, and oxygen, which becomes trapped in the package during packaging. With a one way valve, flushing or purging of the package to eliminate such trapped air may be unnecessary.

Valves have been known, and an example of such a valve is illustrated in Canadian Pat. No. 1,177,449 entitled OVERPRESSURE VALVE FOR PACKAGES WITH FLEXIBLE WALLS which issued on Nov. 6, 1984 in the name of Wipf AG Verpackungen. In this patent a one-way valve is disclosed which essentially comprises a valve body in which seats a circular imperforate valve diaphragm in a disk-like depression. A keeper is inserted into the depression and prevents the diaphragm from being removed from the valve seat. The keeper is retained under a lip formed on the sides of the disk-like depression.

However, this Wipf device has several disadvantages. Firstly, the device requires that the keeper be inserted into the valve body after the diaphragm has been put in place. Having a valve body which is essentially of two piece construction, namely, the keeper, and the valve body with the disk like depression, is expensive and labour intensive to assemble. Secondly, in the installed position, the keeper is exposed to the outside of the package. Therefore, the keeper may be accidentally or purposely removed thereby disrupting the ability of the valve to function as intended. This is clearly unacceptable and it would be preferable if the valve was kept safely out of sight. A further disadvantage with this device is that there is no disclosure of a filter or the like to prevent fine dust or other bits of the food stuffs from entering into the valve opening and being lodged between the diaphragm and the valve seat. Such a situation would impair the ability of the valve seat to prevent the ingress of oxygen air or the like into the package. Yet a further problem with this device is that when the valve diaphram ceases to function, for any reason, there is no provision for any back-up to at least ensure a minimum level of functioning of the valve.

What is desired is a unitary valve body that is simple to manufacture and easy to install. What is also desired is a valve body which can be secured to a package in a manner that the operational elements of the valve are not exposed externally. A further aspect that is desirable is that a gas produced inside the package be filtered to prevent the valve seat from being contaminated. It would also be preferrable to provide a valve having a second sealing action, which could act as a safety measure.

SUMMARY OF THE INVENTION

Accordingly, there is provided in the present invention a one way valve for flexibly walled packages, said valve comprising:

a unitary valve body having an outer face comprising a raised anvil having a first valve seat a generally planar surface adjacent said anvil forming a second valve seat, said second valve seat terminating in an outer wall, said outer wall including a first marginal portion extending towards said anvil and a second marginal portion extending away from said anvil, an elastic diaphragm seated on said second valve seat, at least a part of said diaphragm being below said first marginal portion of said outer wall, at least one aperture through said valve body from said outer face to an inner face, said aperture opening at one end onto said second valve seat and at the other end onto an indented portion of said inner face, and a filter housed in said indented portion across said other end opening, said valve body being securable to a web of said flexibly walled packaging around said second marginal portion, said web, when said valve body is so secured, being stretched across said first valve seat and having a hole punched therein, whereby pressure in at least one of said apertures can raise a portion of said elastic diaphragm away from said second valve seat, and subsequently raise a portion of said web above said first valve seat.

DESCRIPTION OF THE DRAWINGS

To more clearly illustrate the invention and to show how the invention may be put into effect, reference will now be made by way of example only to a preferred embodiment, illustrated in the following figures and in which.

DESCRIPTION OF A PREFERRED EMBODIMENT

Figure 1:
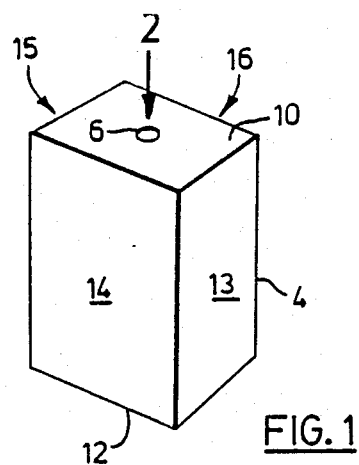
FIG. 1 is an isometric view of a flexibly walled package, having a valve according to the present invention.

FIG. 1 shows a flexibly walled package or container 4, with an opening 6 formed in the flexible wall 8 (shown in cross section in FIG. 4) of the container 4. The flexible wall 8 may also be referred to as a web. Web 8 has been folded and sealed, according to known techniques, in such a manner as to form a top 10, a bottom 12, and sides 13, 14, 15 and 16 to the container 4. Also, while the opening 6 is shown on the top 10 of the container 4, it will be appreciated that the opening 6 could be provided on any of the sides 13, 14, 15 or 16.

Figure 2:
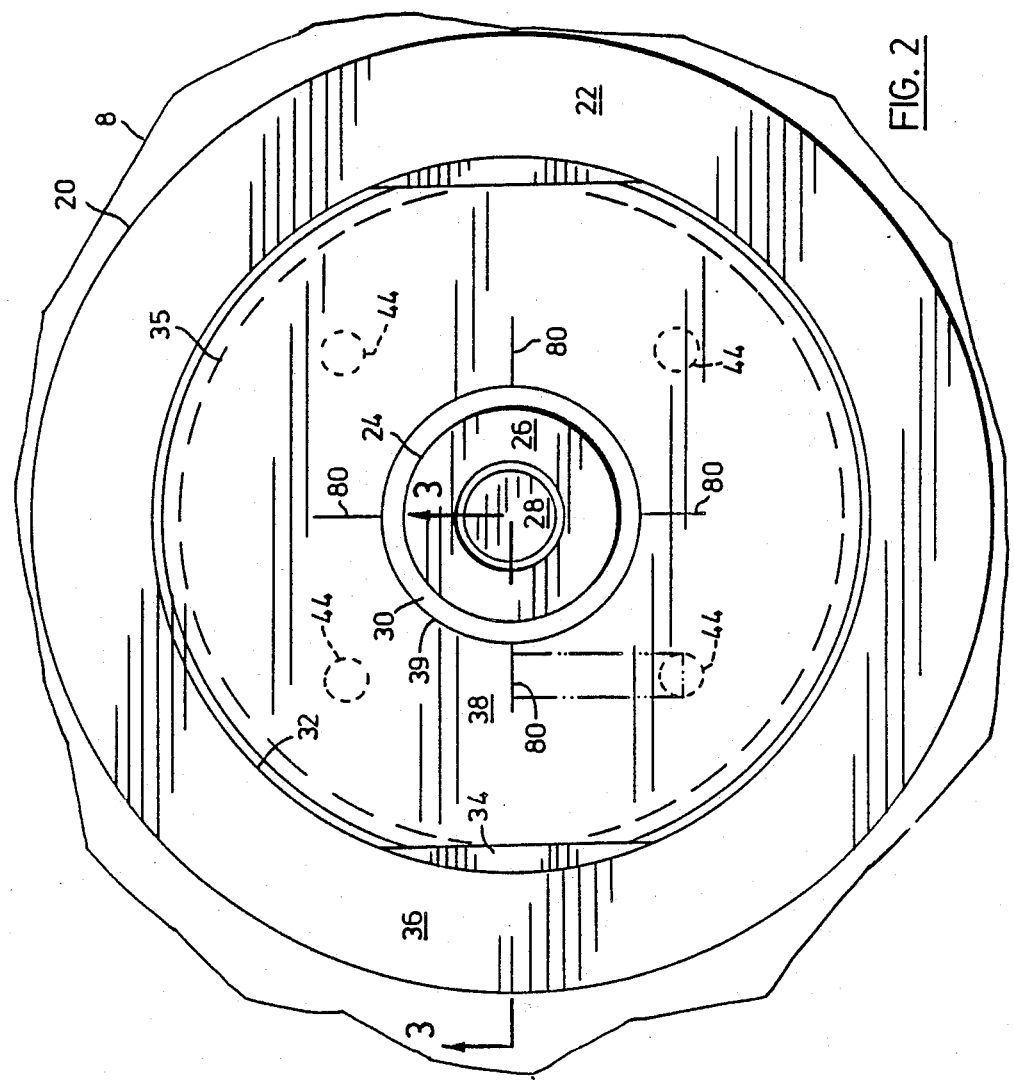
FIG. 2 is a view from above of the present invention with the web of the flexibly walled package broken away.

FIG. 2 shows a view from above of a unitary valve body 20, according to the present invention. For ease of understanding, in FIG. 2 the flexible wall or web 8 of the container 4 is shown broken away. However, the valve body 20 is secured to the web 8 in the portion that has been broken away. This is described in detail below.

The unitary valve body 20 has an outer face 22 which is visible in FIG. 2. The outer face 22 comprises a raised anvil 24 having a first valve seat 26 surrounding a central depression 28. In the preferred embodiment illustrated, the anvil 24 is circular in cross section and has a common base and forms part of valve body 20. A generally planar surface is provided adjacent the anvil 24 and forms a second valve seat 30. As shown the second valve seat 30 is concentric with the anvil 24. The second valve seat 30 terminates in an outer wall 32. The outer wall 32 includes first marginal portions 34 extending towards the anvil and a second marginal portion 36 extending away from the anvil 24. The first marginal portions 34 may be intermittent as shown, or may be continuous as indicated in dotted outline 35. The valve body 20 is preferrably thermoformed from polyethylene or polypropylene which is compatible with, and preferably thermally weldable to, the web 8 of the container 4.

Seated on the second valve seat 30 is an elastic diaphragm 38. At least a part 40 of the diaphragm 38 would be located below the first marginal portions 34 of the outer wall 32. One purpose of the first marginal portions 34 is to retain the valve diaphragm 38, in place, during the assembly of the valve body 20 to the web 8. The diaphragm 38 is preferably shaped like a washer, with a central aperture 39 to fit around the anvil 24, is flexible under the influence of pressure, and is of the type that will return to its flat shape, by reason of its inherent resiliency, when not subject to such pressure.

The unitary valve body 20 would also be provided with at least one aperture 44 through the valve body 20 from the outer face 22 to an inner face 46. In the preferred embodiment, as illustrated in FIG. 2, four apertures 44 are provided. However, the exact number and configuration of apertures may be varied although four does provide satisfactory results.

Figure 3:
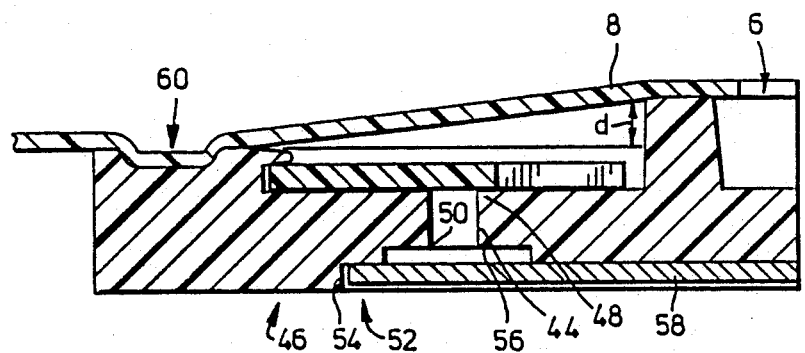
FIG. 3 is a sectional view along the lines 3—3 of FIG. 2.

FIG. 3 shows a sectional view along the lines 3-3 of FIG. 2. FIG. 3 shows aperture 44 opening at one end 48 onto said second valve seat 30 and at the other end 50 onto said inner face 46. It will be noted that there is an indented portion in inner face 46 as indicated at 52. The indented portion comprises a disk shaped indentation 54 which registers with and overlies an annular indentation 56. Housed within the disk shaped indentation 54 is a filter 58.

As shown in FIG. 3, the flexible web 8 of container 4 is secured in an air tight manner around the second marginal portion 36. This is indicated generally at 60. The preferred method of securement is a heat and pressure inducing die which can thermally bond the flexible web 8 to the second marginal portion 36 around the generally circular perimeter of the second marginal portion. In this manner a secure air tight seal is formed between the valve body 20 and the web 8. Other methods of attachment such as dissolving glues or contact cements may also be utilized where appropriate. It will be appreciated that in addition to providing a suitable place for attaching the web 8 to the valve body 20, the second marginal portion 36 acts as a stiffening ring for the valve body 20.

When the valve body 20 is secured to the web 8, the upright or raised anvil 24 causes the web to stretch tightly across the first valve seat 26. Because of the central depression 28 provided in the anvil 24, the opening 6 can easily be punched into the web 8, as shown.

Figure 4:
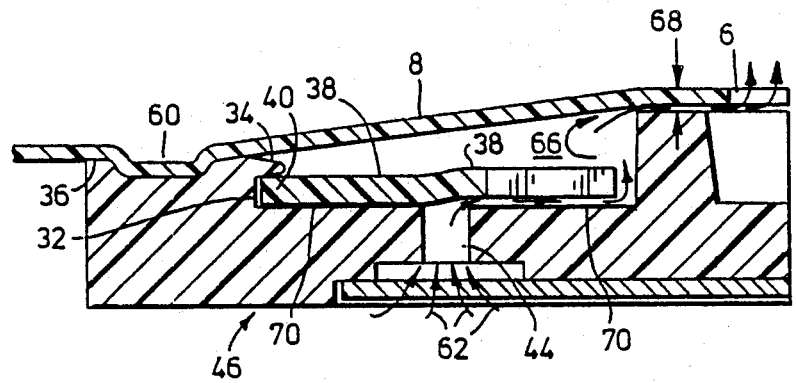
FIG. 4 is the sectional of FIG. 3 showing the effects of pressure inside the flexibly walled package.

In FIG. 4, the arrows 62 indicate the flow of gas as a result of the build up of pressure inside the container. First, the gas passes through the filter 58 into the annular indentation 56. The filter will stop most air borne suspended particles, thus preventing the particles from interferring with the seating of the diaphragm 38 on the second valve seat 30. Further, by reason of the annular indentation 56, any accumulation of air borne particles in the filter media adjacent the aperture 44 will not result in a blockage of the flow of the gases. Such gas will be free to flow into the annular ring shaped indentation 56, anywhere around its circumpherence, and then find its way along indentation 56 to an aperture 44.

The gas then passes upwardly through the aperture 44 and deflects the valve diaphragm 38 upwardly as shown. This allows the gas to pass by the diaphragm 38 and into a chamber 66 formed between the unitary valve body 20 the diaphragm 38 the upright anvil 24 and the web 8. Then, upon pressure accumulating in the chamber 66, the web 8 will be lifted away from the first valve seat 26 to form a gap 68 as shown. The gas can then escape outwardly of the opening 6 as shown.

It will now be appreciated that the instant invention provides for a two stage one way valve. Thus, even if material does penetrate the filter 58 and disrupt the effectiveness of the seating of the diaphragm 38 on the second valve seat 30, the additional seating of the web 8 on the first valve seat 26 provides another barrier against the ingress of oxygen, air and the like into the package 4. It has been found that good results are achieved when the distance d, shown in FIG. 3, is about 0.033". This distance provides a snug fit of the web 8 on the first valve seat 26, yet allows the web 8 to comfortably lift away from the first valve seat as desired. It will be appreciated that the distance d can be varied, and that the greater the distance, the more secure the seat is of the web 8 on the first valve seat 26.

To assist the functioning of the valve diaphragm 38 on the second valve seat 30 it is preferrable to provide a coating film 70. Such a film is preferrably thin, viscous, non-drying, medically safe, tasteless and chemically neutral. Satisfactory results have been achieved with silicon oil, which can be applied to the underside of valve diaphragm 38, prior to it being placed around anvil 24 on the second valve seat 30. Such a coating film 70 preferrably effects a bubble tight shut-off.

The inherent resiliency of the material of the valve diaphragm 38 together with the coating film 70 cooperate to require a lift or break pressure of 4-5 millibars. At this pressure difference between the inside face and outside face of the valve body 20, the valve diaphragm 38 will gently lift away from the valve seat 30, thus exposing the apertures 44 located underneath. Pressure equilization then takes place, until 1-2 millibars of overpressure is all that remains inside of the package 4. At this point, the resiliency of valve diaphragm 38 and the adhesion of the coating film combine to flatten out the valve diaphragm 38 to again cover the apertures 44.

To improve the functioning of the valve, the valve diaphragm may be relieved. For example, as shown in FIG. 2, there may be provided relief in the form of radial slits 80 in the valve diaphragm 38. The radial slits facilitate the lifting of the diaphragm 38 adjacent the anvil as shown in FIG. 4. Those skilled in the art will appreciate that the valve body 20 will be manipulated prior to being secured in position against the web 8 of the package 4. In order to maintain the diaphragm 38 in position during such manipulation, as would normally take place in manufacturing, the first marginal portions 34 are provided. As shown in FIGS. 3 and 4 the first marginal portions abut against the peripheral edge of the diaphragm 38, to secure the same in position. During the heat sealing of the valve body 20 to the web 8 it is difficult to control the extent of deformation that will be caused by any heat treatment, therefore, where the diaphragm is required to deflect adjacent the periphery, problems may be caused by an excessive amount of heat treatment which jams the edge of the diaphragm 38 between the web 8, and the valve seat. However, in the instant invention, such difficulties are overcome by reason of allowing the valve diaphragm 38 to raise at its inner edge as indicated in FIG. 4. This will provide a reliable valve mechanism even in view of the problems associated with thermal welding procedure which is the preferred method in the art for attaching the unitary valve body 20 to the web 8. It will be appreciated that radial slits are not the only way the valve diaphragm 38 may be relieved to achieve the desired result. For example, wedge shaped cuts, holes (not overlying apertures 44) or the like would also suffice.

It will be appreciated by those skilled in the art that while the foregoing constitutes a description of a preferred embodiment by way of example, various modifications are possible within the broad scope of the invention. For example, while the preferred embodiment shows four apertures 44, located approximately ½ way between the outer wall 32 and the anvil 24, other numbers of apertures at other locations would also be appropriate. Other modifications are also within the broad scope of the present invention as will be appreciated by those skilled in the art.

I claim:

1. A one way valve for flexibly walled packages, said valve comprising:
   a unitary valve body having an outer face comprising a raised anvil having a first valve seat, a generally planar surface adjacent said anvil forming a second valve seat, said second valve seat terminating in an outer wall, said outer wall including a first marginal portion extending towards said anvil and a second marginal portion extending away from said anvil,
   an elastic diaphragm seated on said second valve seat, at least a part of said diaphragm being below said first marginal portion of said outer wall,
   at least one aperture through said valve body from said outer face to an inner face, said aperture opening at one end onto said second valve seat and at the other end onto an indented portion of said inner face, and
   a filter housed in said indented portion across said other end of said aperture,
   said valve body being securable to a web of said flexibly walled packaging around said second marginal portion, said web, when said valve body is so secured, being stretched across said first valve seat and having a hole punched therein, whereby pressure in at least one of said apertures can raise a portion of said elastic diaphragm away from said second valve seat, and subsequently raise a portion of said web above said first valve seat.

2. A one way valve as claimed in claim 1 wherein said diaphragm is relieved to facilitate the defection of the diaphragm away from the second valve seat under the influence of pressure.

3. The one way valve as claimed in claim 2, wherein said diaphragm is relieved adjacent said anvil and said pressure raises said diaphragm adjacent said anvil.

4. The one way valve as claimed in claim 3, wherein said relieved diaphragm includes radial slits adjacent but not overlying said aperture in said valve body.

5. The one way valve as claimed in claim 4, wherein said radial slits extend radially outward from said anvil towards said outer wall.

6. The one way valve as claimed in claim 1, wherein said anvil is centrally located, and said second valve seat is an annular surface between said anvil and said wall.

7. The one way valve as claimed in claim 1, wherein said anvil has a central depression to facilitate said hole being punched inwardly.

8. The one way valve as claimed in claim 6 wherein said first valve seat and said second marginal portion are concentric.

9. The one way valve of claim 1, wherein said indented portion includes an annular indentation located between said aperture and said filter and registering with said aperture.

10. The one way valve of claim 1, wherein said first marginal portion is intermittent, and retains said diaphragm therebelow at specific circumferential locations.

11. The one way valve of claim 1, wherein said first marginal portion is continuous and retains said diaphragm therebelow continuously around an outer edge thereof.

12. A flexibly walled package having a one way valve, said valve comprising:
    a unitary valve body having an outer face comprising a raised anvil having a first valve seat a generally planar surface adjacent said anvil forming a second valve seat, said second valve seat terminating in an outer wall, said outer wall including a first marginal portion extending towards said anvil and a second marginal portion extending away from said anvil,
    an elastic diaphragm seated on said second valve seat, at least a part of said diaphragm being below said first marginal portion of said outer wall,
    at least one aperture through said valve body from said outer face to an inner face, said aperture opening at one end onto said second valve seat and at the other end onto an indented portion of said inner face, and a filter housed in said indented portion across said other end of said aperture, said valve body being securable to a web of said flexibly walled packaging around said second marginal portion, said web, when said valve body is so secured, being stretched across said first valve seat and having a hole punched therein, whereby pressure in at least one of said apertures can raise a portion of said elastic diaphragm away from said second valve seat, and subsequently raise a portion of said web above said first valve seat.

13. A flexibly walled package having a one way valve as claimed in claim 1, 2 or 12 wherein a coating film is provided between the elastic diaphragm and said second valve seat.

14. A flexibly walled package having a one way valve as claimed in claim 13 wherein said coating film comprises silicon oil.

* * * * *